United States Patent
Wilton et al.

(10) Patent No.: US 11,195,208 B2
(45) Date of Patent: Dec. 7, 2021

(54) SYSTEMS AND METHODS FOR PROGRAMMATIC TARGETED DIGITAL ADVERTISING

(71) Applicant: PERPETUAL MEDIA, LLC, Marina Del Ray, CA (US)

(72) Inventors: Brandon Wilton, Marina Del Rey, CA (US); Jay Wilton, Marina Del Rey, CA (US)

(73) Assignee: PERPETUAL MEDIA, LLC, Marina Del Ray, CA (US)

( * ) Notice: Subject to any disclaimer, the term of this patent is extended or adjusted under 35 U.S.C. 154(b) by 945 days.

(21) Appl. No.: 15/722,185

(22) Filed: Oct. 2, 2017

(65) Prior Publication Data

US 2019/0102803 A1 Apr. 4, 2019

(51) Int. Cl.
G06Q 30/02 (2012.01)
H04L 29/08 (2006.01)

(52) U.S. Cl.
CPC ..... *G06Q 30/0271* (2013.01); *G06Q 30/0275* (2013.01); *G06Q 30/0277* (2013.01); *H04L 67/146* (2013.01); *H04L 67/20* (2013.01); *H04L 67/306* (2013.01)

(58) Field of Classification Search
CPC .............. G06Q 30/02; G06Q 30/0271; G06Q 30/0275; G06Q 30/0277; H04L 67/20; H04L 67/306; H04L 67/146
See application file for complete search history.

(56) References Cited

U.S. PATENT DOCUMENTS

| | | |
|---|---|---|
| 5,305,195 A | 4/1994 | Murphy |
| 6,381,626 B1 | 4/2002 | De Leo et al. |
| 6,567,842 B2 | 5/2003 | De Leo et al. |
| 8,606,630 B2 | 12/2013 | Fordyce, III et al. |
| 8,751,310 B2 | 6/2014 | Van Datta et al. |
| 9,087,428 B1 | 7/2015 | Velline et al. |
| 9,129,301 B2 | 9/2015 | Van Datta et al. |
| 9,342,835 B2 | 5/2016 | Fordyce, III et al. |
| 2002/0003162 A1 | 1/2002 | Ferber et al. |
| 2003/0040959 A1 | 2/2003 | Fei et al. |

(Continued)

OTHER PUBLICATIONS

GWallet announces powerful new mobile monetization solutions; partners with mobclix to extend reach. (Sep. 8, 2010). Business Wire Retrieved from https://dialog.proquest.com (Year: 2010).*

(Continued)

*Primary Examiner* — Eric R Netzloff
*Assistant Examiner* — Michael R Stibley
(74) *Attorney, Agent, or Firm* — Carter, DeLuca & Farrell LLP; George Likourezos (57) ABSTRACT

The present disclosure is directed to systems and methods for programmatic digital advertisements that are personalized and uniquely targeted to individually-identified consumers via non-personal, but individually accessed devices. The consumer accessing a non-personal device is identified and data cookie pertaining to the user is created and sent to third-party programmatic advertising exchanges for the use in real time bidding, private marketplace deals, or programmatic guaranteed sales. This allows for personalized digital advertisements to be delivered to a specific user accessing a non-personal device.

20 Claims, 5 Drawing Sheets

(56) References Cited

U.S. PATENT DOCUMENTS

| | | | | |
|---|---|---|---|---|
| 2004/0003102 A1* | 1/2004 | DuVall | ............... | H04L 67/2842 |
| | | | | 709/231 |
| 2011/0258049 A1* | 10/2011 | Ramer | ............... | G06Q 30/0273 |
| | | | | 705/14.66 |
| 2012/0297416 A1 | 11/2012 | Torrieri et al. | | |
| 2014/0278981 A1* | 9/2014 | Mersov | ................. | G06Q 30/08 |
| | | | | 705/14.53 |
| 2016/0019598 A1* | 1/2016 | Harrison | ............ | G06Q 30/0275 |
| | | | | 705/14.71 |
| 2017/0076553 A1* | 3/2017 | Washington | .......... | A63F 13/837 |
| 2018/0005483 A1* | 1/2018 | Washington | ........ | G07F 17/3213 |

OTHER PUBLICATIONS

G. Chen, J. H. Cox, A. S. Uluagac and J. A. Copeland, "In-Depth Survey of Digital Advertising Technologies," in IEEE Communications Surveys & Tutorials, vol. 18, No. 3, pp. 2124-2148, thirdquarter 2016, doi: 10.1109/COMST.2016.2519912. (Year: 2016).*

Ben Kneen, How Real Time Bidding, DSPS, SSPS, and Ad Exchanges Work, Ad Ops Insider, Dec. 8, 2010, http://www.adopsinsider.com/ad-serving/how-dsps-ssps-and-ad-exchanges-work/.

Liz Benston, Technology Allows Advertising on Idle Slot Machines, Las Vegas Sun Newspaper, Jul. 3, 2010, https://lasvegassun.com/news/2010/jul/03/slots-offer-ad-exposure/.

* cited by examiner

SYSTEMS AND METHODS FOR PROGRAMMATIC TARGETED DIGITAL ADVERTISING

FIELD OF USE

The present disclosure relates generally to systems and methods for targeted digital advertising. More specifically, the present disclosure relates to programmatic targeted digital advertisements that are personalized and uniquely targeted to individually-identified consumers via non-personal, but individually accessed devices.

BACKGROUND

Programmatic targeted digital advertising has existed for several decades. The advertising has typically been delivered to a unique personal device that is owned or controlled by a user, such as a smartphone, mobile computer, tablet, laptop, and/or desktop computer. The ability to target an advertisement (ad) to a specific user is based on data collected from that unique device, and it is assumed that the owner of that device is the user when the ads are served. The unique user data is typically stored in a cookie, which is a small file on the user's personal device designed to store a modest amount of user information and may be accessible by a Web server. When certain programs or apps that contain advertising are used on the device, specific ads are requested and sent to the program or app based on unique data in that user's cookie.

In a more general and more common process, broader targeted digital advertising is sometimes served on screens in known specific locations, based on broader attributes of audience members that are known to typically be in or near those general locations, such as zip code, city, or county, or based on elements affecting the audience in that location, such as weather, day, date, or time of day.

Currently, programmatic targeted digital advertising is limited to either the specific device of the individual user, or to devices to be viewed by a broad, general audience. As such, in order for advertisements to reach a specific individual user, it must be done via their unique personal device.

Thus, what is needed is system and method that can provide a programmatic digital advertisement to a non-personal device, that is targeted to the specific user currently using the non-personal device.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to systems and methods that may programmatically serve specific and uniquely targeted personalized digital advertisements to individually identified consumers on a non-personal, but individually accessed, device. These "non-personal devices" may include slot machines, electronic gaming machines (EGMs), coin operated amusement machines (COAMs), game of skill terminals, video lottery terminals (VTLs), bank automatic teller machines (ATMs), and the like. The individual may be identified by the system via a "personal identification device", which may be a gaming players club card (also referred to as a player's card, player's club card, or slot club card), a credit/debit card, merchant services data, or a smartphone app that contains personal data similar to that which is found in a players club card. The specific targeting and personalization may be based on attributes of each individual's unique profile data. The individual's data may reside in pre-existing proprietary databases. The individual will be identified, the data accessed, and a personalized ad is transcoded and served, in real-time, to the specific individual that is currently accessing the non-personal device.

In one embodiment, the targeted user is identified via the personal identification device, the personalized data is sent from the card or app via a server integration to a database that contains attributes and data related to the targeted user. A personal and specifically identifiable interactive session is triggered. A cookie data may then be created, based on a certain number of these attributes that are valuable to programmatic advertisers. At the same time, a unique device identification (ID) may be activated, which serves as identification of the specific non-personal device for when the ad is returned. The cookie data may then be sent through a server to integrated third-party programmatic advertising exchanges for the use in programmatic auctions such as real time bidding (RTB), private marketplace (PMP), or programmatic guaranteed sales. Once the programmatic auction is won on the exchange by an advertiser, the specific corresponding ad file may be delivered to a private media platform, where it is transcoded into streaming video format for delivery over a network to the specific non-personal device, where it is displayed to that specific individual in real-time for the duration of their use of the non-personal device. A proof-of-play is created when the ad is delivered to the user accessing the non-personal device. The proof-of-play contains information pertaining to the both the individual and the accessed non-personalized device. The proof-of-play serves as proof to the third-party programmatic advertising partners that there is a specific individual accessing the specific non-personalized device when the ad is displayed.

In another embodiment, a targeted user may insert a personal players card into the non-personal device, which may trigger a personally and specifically identifiable interactive session. The individual may be identified and the targeted user's cookie data may be accessed to create a system data cookie specific to the targeted user. The personalized data may be sent, via a server integration, to third-party programmatic advertising exchanges. The system data cookie allows a unique match on the system between media buyer targets and the targeted user, which may allow a specifically targeted ad to be served to the targeted user. This creates a better value proposition for the programmatic advertiser. If there is an auction, the winner's ad, which is relevant to the targeted user, may be delivered to the non-personal device in real-time. This process may repeat or continue until the targeted user is no longer identified as using the non-personal device (such as by the removal of the players club card). If a different user uses the non-personal device, the ads displayed to that user will be targeted and relevant to that different user.

The system and method of the present disclosure may create a unique system data cookie from certain personal information submitted by the user when obtaining the players club card and submitted during on-game sessions of the non-personal devices. The system data cookie preferably contains certain individual attributes of that user that are formatted to be specifically usable as targeting data to request programmatic advertising from external programmatic advertisement providers. The system requests programmatic targeted advertisements based on the information on the system data cookie. Video streaming technology may be used to transcode the programmatic targeted ad content and then stream that content to the non-personal device that is sessioned with the targeted user. The system schedules, distributes, and directs specific streaming ads to various non-personal devices as users session with the device. The system of the present disclosure allows data transmission and/or communications between the non-personal devices, the platform server, and the external programmatic ad providers.

In another embodiment, the system may create (or obtain) and serve programmatic targeted advertisements to individual consumers (targeted users) on non-personal devices, such as EGMs, COAMs, and VLTs in real time. The system of the present disclosure may create the targeted ads using players card (or other personal identification device) information or merchant services data (or that same personal data may be contained within a smartphone app that is on the user's smartphone (a players club app)). This may allow for real-time user targeting and ad serving on non-personalized devices connected to the server of the system. Once the user's players club card is inserted into an EGM, or a session is activated through a smartphone app or card on a COAM or VLT, the targeted user's interactive session may begin. The unique device ID may be activated and correlated to the specific cookie for identification of the device when the ad is returned. The personalized data from the personal identification device (card or app) may then be sent via a server integration to a data base (on the system server) that contains the attributes for that customer. The system server is where the customer data "cookie" (system data cookie) may be created. When the customer is identified, a certain number of their attributes (all of which are preferably anonymous) that are valuable to programmatic advertisement providers, are attached to the system data cookie for transmission into the programmatic ad system. The individual data cookie may preferably then be sent, by the system server, to integrated third party programmatic advertising exchanges for the use in RTB, PMP, or programmatic guaranteed sales. This data or "advertising cookie" creates a better value proposition for the programmatic advertisement provider, because their bidding profile is based on a matching set of identified consumer attributes. Once the programmatic auction is won on the exchange by an advertiser, the specific corresponding ad file may be delivered to the system server where it is transcoded into streaming video format for delivery over the system. The specific corresponding transcoded ad may be delivered to the non-personal device where the targeted data originated (via the unique device ID), via a system streaming server, and is displayed to that specific player (the targeted user) in real-time. Specific and relevant advertisements will continue to be requested, bid upon, won, transcoded, and served to the identified and targeted user on the screen or display of the non-personal device during the entire length of their on-game session. This process may continue until the card is removed, or the targeted user is no longer identified as using the non-personal device. This will end the active targeted session for that targeted user. The process may repeat for the next player/user to insert their card or otherwise be identified as using the machine.

In another embodiment, the systems and methods can serve general, non-targeted, external ads to the non-personal devices.

Other embodiments can serve internal content to the display of the non-personal device.

Other embodiments can stream content to both personal and non-personal devices.

One embodiment may be a system for providing programmatic targeted digital advertisements to targeted users comprising: a system server; a system streaming server; and a relational database management system server; wherein the system server is networked to the relational database management system server; wherein the relational database management system server is networked to one or more non-personal devices; wherein the one or more non-personal devices are networked to a device streaming server; wherein the device streaming server is networked to the system streaming server; wherein the system server is networked to one or more ad exchanges and one or more programmatic ad providers; wherein a targeted user is identified by a specific one of the one or more non-personal devices via a personal identification device, such that a session is initiated; wherein the personal identification device comprises a personal user data related to the targeted user; wherein the specific one of the one or more non-personal devices sends the personal user data to the relational database management system server along with a device ID; wherein the relational database management system server comprises an attribute database that contains attribute data related to a plurality of potential targeted users; wherein the relational database management system server processes the user data and creates a system data cookie by identifying the targeted user and determining which attributes of the targeted user are relevant for transmission to the one or more programmatic ad providers; wherein the relational database management system server transmits the system data cookie and the device ID to the system server; wherein the system server transmits the system data cookie to the one or more programmatic ad providers via the one or more ad exchanges; wherein the system server accepts from one of the one or more programmatic ad providers an advertisement that is targeted to the targeted user based on the system data cookie; wherein the system server transcodes the targeted advertisement into streaming video format and delivers the transcoded targeted advertisement to the system streaming server; and wherein the system streaming server delivers the transcoded targeted advertisement to the specific one of the one or more non-personal devices via the device ID and the device streaming server. When the transcoded targeted advertisement is displayed on the specific one of the one or more non-personal devices, the non-personal device may create a proof-of-play. The proof-of-play may be transmitted to at least one of the one or more programmatic ad providers via the device streaming server, the system streaming server, and the system server. The one or more non-personal devices may be selected from the group of non-personal devices consisting of: electronic gaming machines, coin operated amusement machines game of skill terminals, video lottery terminals; and automatic teller machines. The attribute data related to a plurality of potential targeted users may be selected from the group of attribute data consisting of: duration of membership, play history, behavior, demographics, and psychographics. The one or more ad exchanges allow the one or more programmatic ad partners to bid on providing the advertisement in response to the system data cookie. The personal identification device may be a players club card. The transcoded targeted ad that is displayed on the specific one of the one or more non-personal devices does not affect or change an experience of the targeted user. A plurality of advertisements may be delivered to the specific one of the non-personal devices during the session of the targeted user.

Another embodiment may be a method for providing programmatic targeted digital advertisements to targeted users comprising the steps: providing a system server; providing a system streaming server; providing a relational database management system server; wherein the system server is networked to the relational database management system server; wherein the relational database management system server is networked to one or more non-personal devices; wherein the one or more non-personal devices are networked to a device streaming server; wherein the device streaming server is networked to the system streaming server; wherein the system server is networked to one or more ad exchanges and one or more programmatic ad providers; wherein a targeted user is identified by a specific one of the one or more non-personal devices via a personal identification device, such that a session is initiated; wherein the personal identification device comprises a personal user data related to the targeted user; wherein the specific one of the one or more non-personal devices sends the personal user data to the relational database management system server along with a device ID; wherein the relational database management system server comprises an attribute database that contains attribute data related to a plurality of potential targeted users; processing the user data by the relational database management system server; creating a system data cookie by the relational database management system server by identifying the targeted user and determining which attributes of the targeted user are relevant for transmission to the one or more programmatic ad providers; transmitting, by the relational database management system server, the system data cookie and the device ID to the system server; transmitting, by the system server, the system data cookie to the one or more programmatic ad providers via the one or more ad exchanges; accepting, by the system server, an advertisement that is targeted to the targeted user based on the system data cookie, from one of the one or more programmatic ad providers; transcoding, by the system server, the targeted advertisement into streaming video format; delivering, by the system server, the transcoded targeted advertisement to the system streaming server; and delivering, by the system streaming server, the transcoded targeted advertisement to the specific one of the one or more non-personal devices via the device ID and the device streaming server. When the transcoded targeted advertisement is displayed on the specific one of the one or more non-personal devices, the non-personal device may create a proof-of-play. The proof-of-play may be transmitted to at least one of the one or more programmatic ad providers via the device streaming server, the system streaming server, and the system server. The one or more non-personal devices may be selected from the group of non-personal devices consisting of: electronic gaming machines, coin operated amusement machines game of skill terminals, video lottery terminals; and automatic teller machines. The attribute data related to a plurality of potential targeted users may be selected from the group of attribute data consisting of: duration of membership, play history, behavior, demographics, and psychographics. The one or more ad exchanges allow the one or more programmatic ad partners to bid on providing the advertisement in response to the system data cookie. The personal identification device may be a players club card. The transcoded targeted ad that is displayed on the specific one of the one or more non-personal devices does not affect or change an experience of the targeted user. A plurality of advertisements may be delivered to the specific one of the non-personal devices during the session of the targeted user.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present systems may be understood more readily by reference to the following detailed description of preferred embodiments and the examples included therein and to the Figures and their previous and following description.

As will be appreciated by one skilled in the art, the systems and methods may take the form of an entirely hardware embodiment, an entirely software embodiment, or an embodiment combining software and hardware embodiments. Furthermore, the systems and methods may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, compact discs, read-only-memory (CD-ROMs), optical storage devices, or magnetic storage devices.

Embodiments of the systems and methods are described below with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In accordance with the embodiments disclosed herein, the present disclosure is directed to systems and methods that will programmatically serve specific and uniquely targeted personalized digital advertisements to individually identified consumers via non-personal, but individually accessed devices. These "non-personal devices" may include electronic gaming machines EGMs, COAMs, game of skill terminals, ATMs, and/or VTLs. The individual may be identified by the system via a "personal identification device", which may be a gaming players club card (also referred to as a player's card, player's club card, or slot club card), a credit/debit card, merchant services data, or a smartphone app that contains personal data similar to that which is found in a players club card. The specific targeting and personalization may be based on attributes of that individual's unique profile data. The individual's data may reside in pre-existing proprietary databases. The individual may be identified, the data accessed, and the personalized ad transcoded and served, in real-time, to non-personal devices connected to a specific network.

Figure 1:
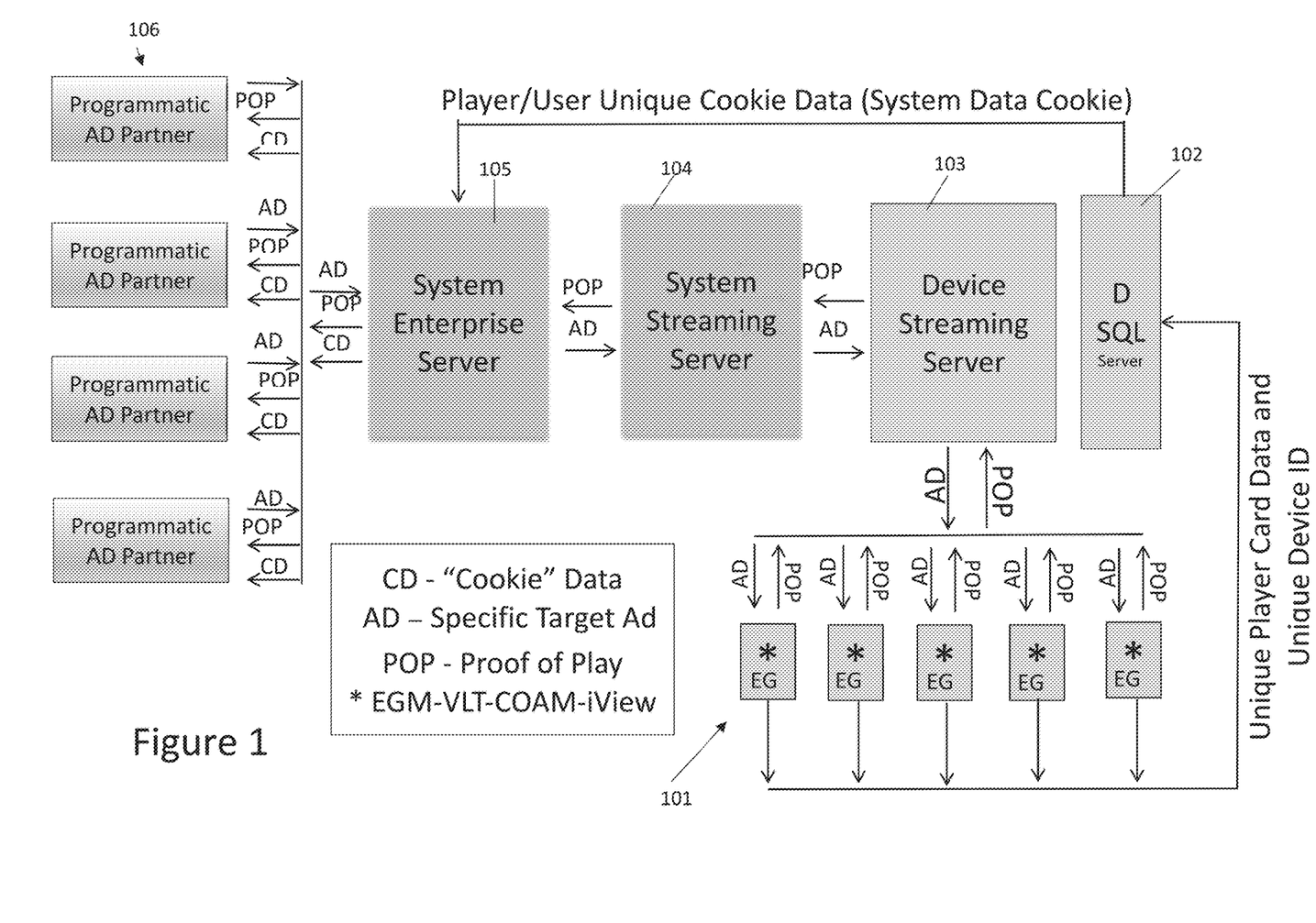
FIG. 1 is a schematic diagram of one embodiment of a system and method for programmatic targeted digital advertising.

FIG. 1 is a schematic diagram of one embodiment of a system and method for programmatic targeted digital advertising. As shown in FIG. 1, the system may be connected to or may comprise: at least one non-personal device 101; various network connections that connect the system together as shown; a relational database management system server 102 (such as the Microsoft® SQL server); a system streaming server 104; a system server 105 (shown as a system enterprise server); at least one programmatic advertisement provider (or partner) 106; and a streaming server 103 connected to the non-personal devices 101.

The non-personal devices may comprise EGMs, COAMs, and VTLs. Communication between the non-personal devices 101 and all servers and programmatic ad partners is suitably made possible with the use of communication protocols, which govern how computers exchange data over a network. The network may be wired, wireless, or a combination of both.

A targeted user can access the non-personal devices 101 by a variety of methods or mechanisms, including, but not limited to, inserting the user's players club card or the user's credit/debit card into the gaming device or ATM, or otherwise providing a personal identification via merchant services data, a related gaming smartphone app, or other personal identification device. As used herein, the term "players club card", "player's card", "player's club card", or "slot club card" refers to a card provided to a guest of an establishment (such as a casino), wherein the card contains personal data only of the individual guest, such as reward points, credit balance remaining, duration of membership, play history, consumer behaviors, demographics, and psychographics. Credit/debit card data, merchant services data, and data residing in a smartphone app (if used for identification) will preferably contain similar data to that which is on the players club card. The personal data stored on the personal identification device is referred to herein as the "user data".

Once the user accesses the non-personal device 101, the non-personal device 101 may send the user data to the relational database management system server 102. The non-personal device 101 may also send a Device ID to the relational database management system server 102. The Device ID is an identification tool that is unique to each non-personal device 101. It serves as a guide so that the system server 105 knows to which specific non-personal device 101 the tailored advertisement should be sent. The relational database management system server 102 may comprise a database that contains data, specifically including attributes, of all potential targeted users. The relational database management system server 102 takes the user data, culling out relevant attributes, and creates a system data cookie by identifying the user and determining which of the user's attributes are relevant for transmission to the programmatic ad providers 106. Relevant attributes may include, but are not limited to, demographics, psychographics, and consumer behavior. The cookie data allows a unique match on the programmatic platform between the media buyer targets and the unique user attributes, and creates a better value proposition for the programmatic advertisement provider, because their bidding profile is based on a matching set of identified user attributes. Psychographics, as used herein, means the quantitative methodology used to describe consumers on psychological attributes. Psychographics includes the study of personality, values, activities, opinions, attitudes, interests, and lifestyles.

FIG. 1 shows that the relational database management system server 102 transmits the system data cookie and Device ID to the system server 105. The system server 105 provides the system data cookie to the programmatic ad partner 106 via the integrated third-party programmatic advertising exchanges for the use in real time bidding, private marketplace, or programmatic guaranteed sales. A method of real time bidding, indicative of similar methods for private marketplace and programmatic guaranteed sales, may comprise putting up an ad for auction on an exchange, advertisers bidding on it, and the ad being delivered to the system server 105 in fractions of a second.

Once the programmatic auction is won on the exchange by an advertisement provider/partner, the specific corresponding ad file may be delivered to the system server 105, where it is transcoded into streaming video format for delivery to the targeted user. The specific corresponding transcoded ad is delivered to the system streaming server 104, which transmits the ad to the device streaming server 103, which then delivers the ad, via reference to the Device ID, to the specific non-personal device 101 accessed by the user to which the system data cookie pertains.

The ad is displayed to the targeted user in real-time. The displayed ad will preferably not affect nor change the user experience while accessing the non-personal device 101. Various other (or same) specific and relevant advertisements will continue to be requested, bid upon, won, transcoded, and served to the identified and targeted user on the non-personal device 101 during the entire length of the on-game session. This process will continue until the card is removed or the user otherwise withdraws from being identified by the non-personal device. This will end the active targeted session for that user. The process may repeat for any other user who accesses a non-personal device and is identified via the personal identification device.

FIG. 1 shows that the non-personal device 101 provides a proof-of-play ("POP") to the gaming server 103 upon delivery and display of the ad. The POP serves as proof to the programmatic ad partner 106 that a single non-personal device 101 has been accessed by the single user that the user data relates to, and that the tailored ad has been delivered to that single user. This proof is important because it provides the programmatic ad partner 106 with confirmation that the intended user of the ad was accessing the non-personal device 101 in real-time at the time of delivery of the ad. The device or gaming server 103 sends the POP through the system streaming server 104 and the system server 105 to the programmatic ad partner 106 who won the auction.

As shown in FIG. 1, the system of the present disclosure allows for programmatic targeted advertisements to be displayed on EGMs, COAMs, and/or VTLs, which, before the present disclosure, has not previously been done. The system of the present disclosure is a complete end-to-end solution that processes specific user data, creates a usable cookie data, requests and pulls programmatic content based on the cookie data, transcodes and distributes the ad into streaming content, returns proof of play, and assembles metrics and analytics pertaining to the delivered ad. FIG. 1 shows that the system may schedule, distribute, and direct the specific streaming ads to the correct individual non-personal devices regardless as to how many non-personal machines are connected to the system.

Figure 2:
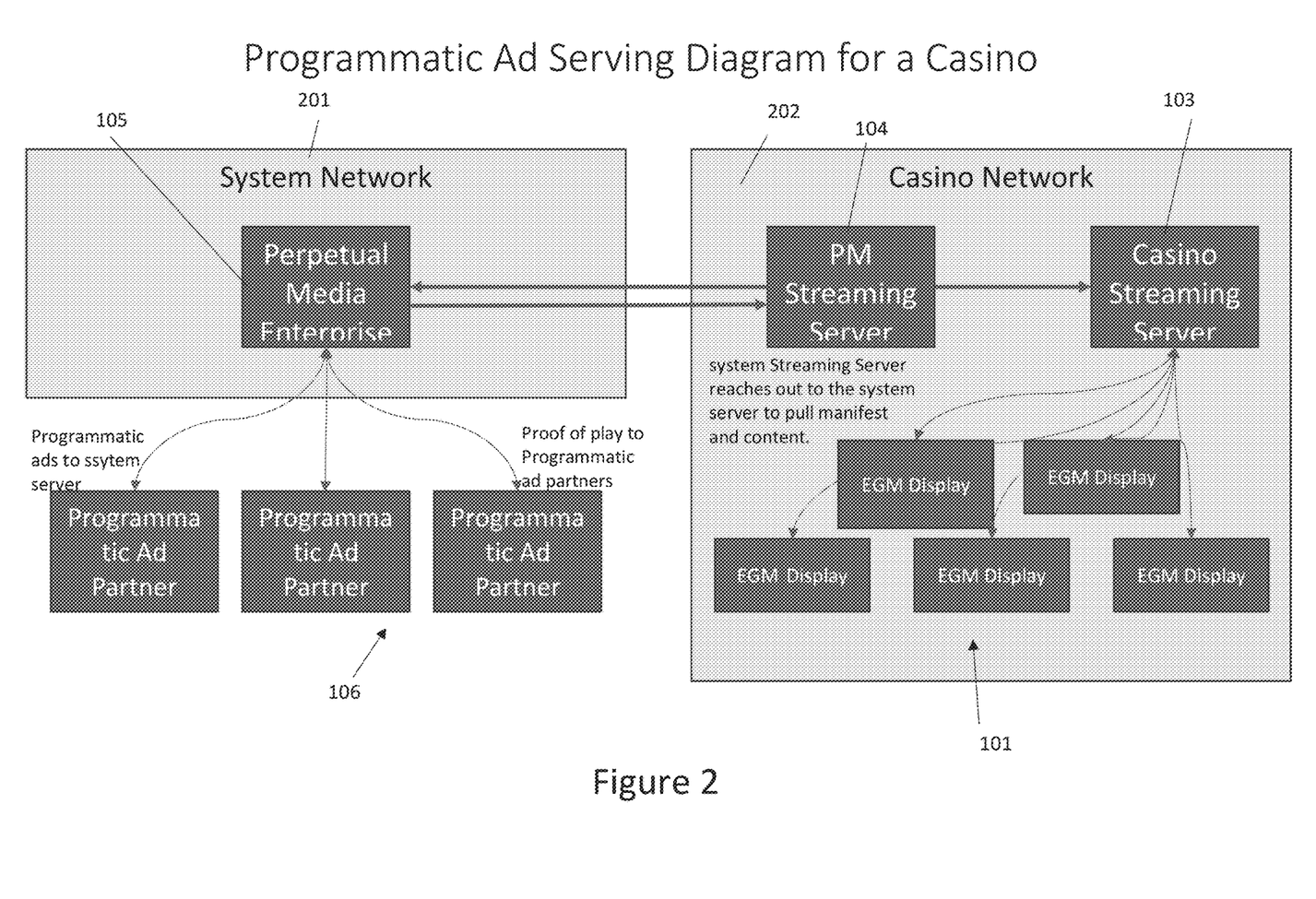
FIG. 2 is a block diagram of one embodiment of a system and method for programmatic targeted digital advertising.

FIG. 2 is a block diagram of one embodiment of a system and method for programmatic targeted digital advertising. FIG. 2 shows an example of the programmatic targeted digital advertisement system for a casino. As shown in FIG. 2, the system network 201 may comprise the system server 105. The casino (or the owner of the non-personal devices) network 202 may comprise the system streaming server 104, the casino streaming server 103 and one or more electronic gaming machines (EGMs) 101 (which are the non-personal devices). The casino network 202, as shown and preferred, may be in communication with the system network 201, wherein the programmatic ad partner 106 may provide a programmatic ad to the system server 105. The system server 105 may send the ad to the system streaming server 104, which sends the ad to the casino streaming server 103, which then delivers the ad to the EGM 101 identified by the Device ID. The EGM 101 may display the ad in real-time to the targeted user that is accessing the EGM 101. A POP is provided to the programmatic ad partner 106 responsible for providing the ad, traveling through the casino streaming server 103, the system streaming server 104, and the system server 105.

Figure 3:
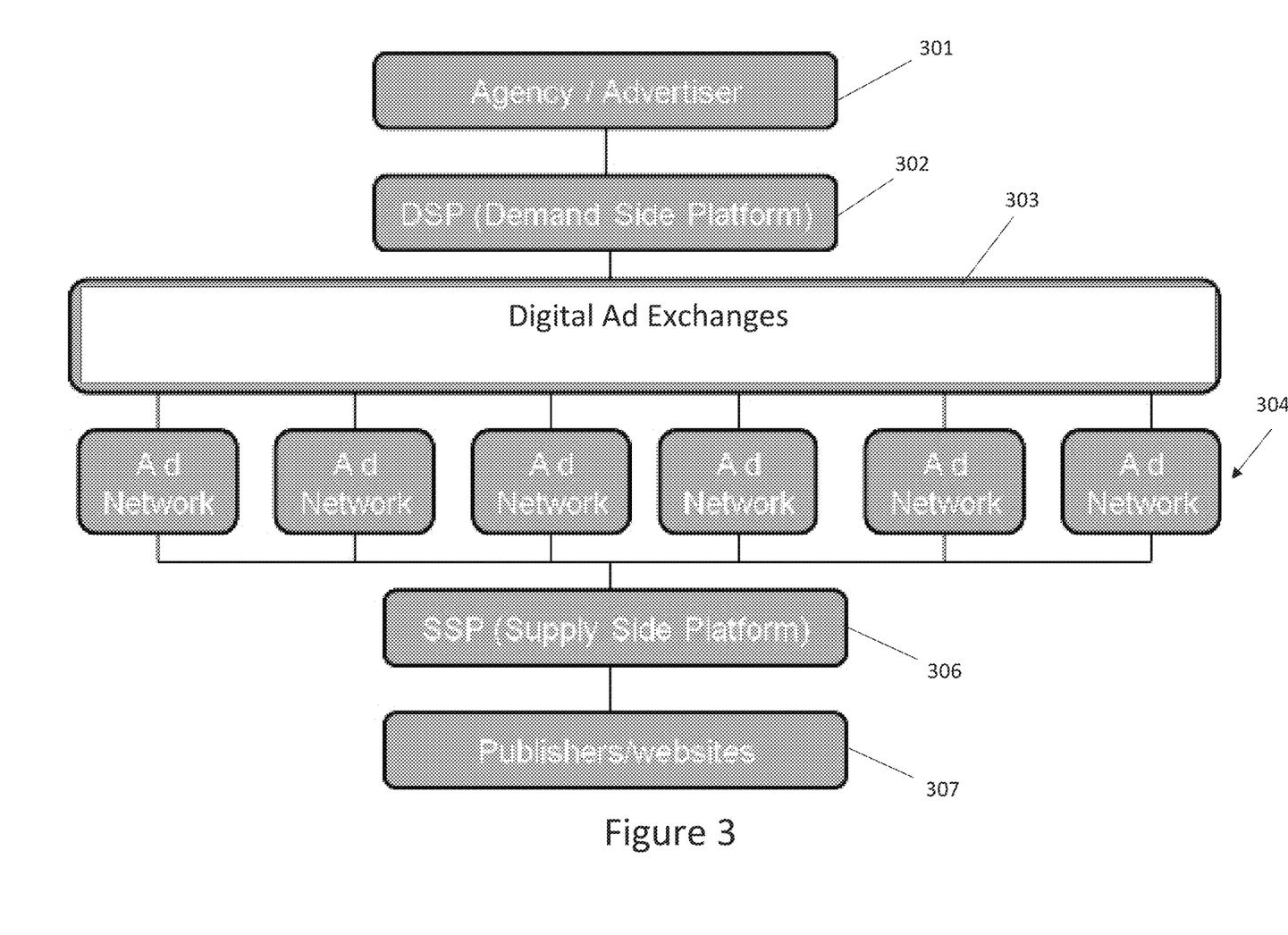
FIG. 3 is a block diagram of one embodiment of how the advertisers, owners of the non-personal devices, and the system of the present disclosure interrelate.

FIG. 3 is a block diagram of one embodiment of how the advertisers, owners of the non-personal devices, and the system of the present disclosure interrelate. As shown in FIG. 3, the system may comprise the targeted digital programmatic advertisement providers 301, which are part of the demand side platform 302, various ad exchanges 303, which may include, but are not limited to, Aol®, Rubicon®, Adscale®, Gumgum®, Yieldlab®, PubMatic®, Doubleclick®, and OpenX®. In another embodiment, the ad exchange can be entirely provided by the system. FIG. 3 also shows that the system may comprise non-personal device owners 304, which are also referred to as Ad Network providers. The system may also comprise the supply side platform 306, which may comprise the system server and the streaming servers. The supply side platform 306 may also comprise the publisher/website 307, which may comprise the EGMs, COAMs, and VLTs.

Figure 4:
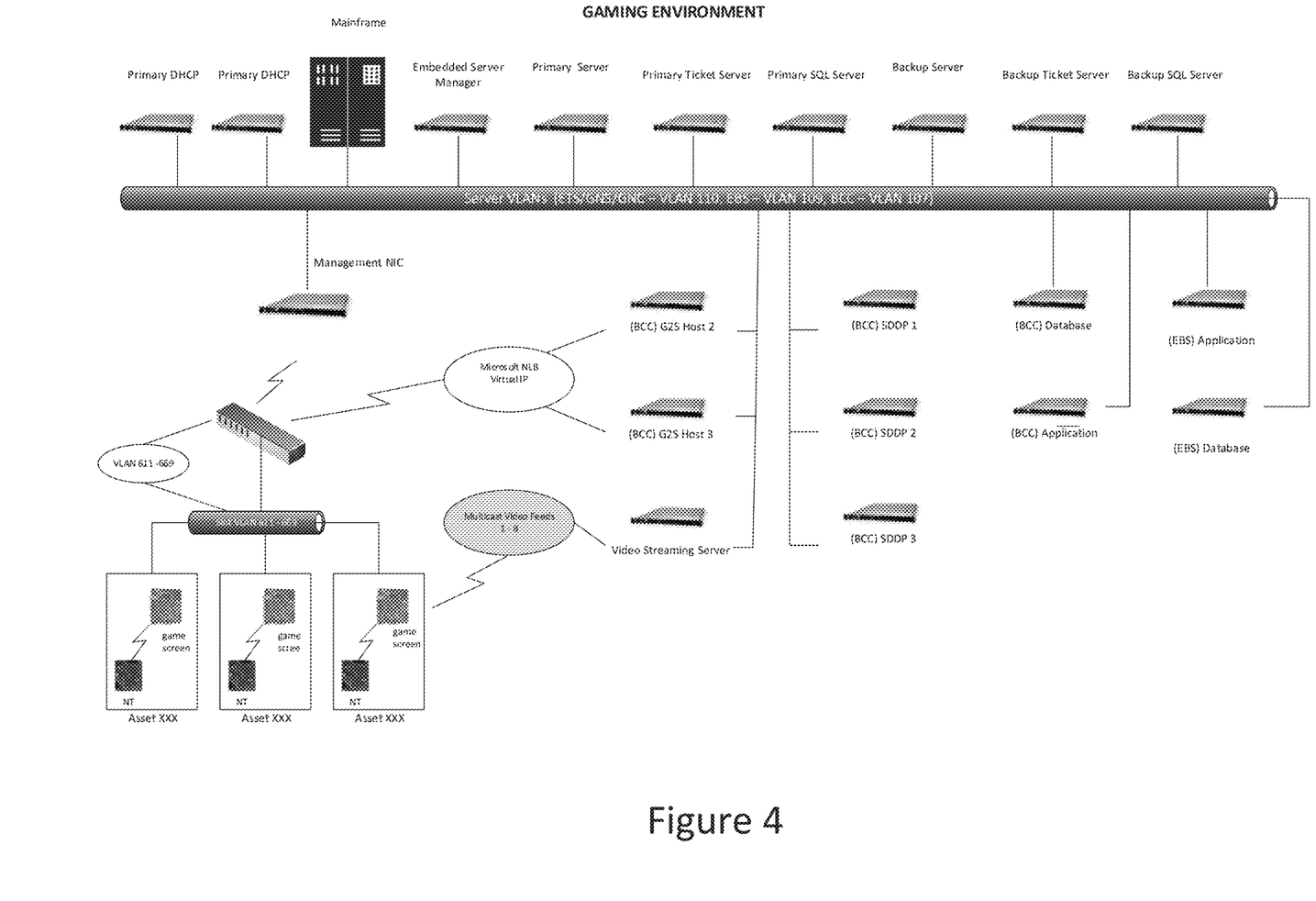
FIG. 4 is a block diagram of one embodiment gaming environment of one embodiment of a system and method for programmatic targeted digital advertising.

FIG. 4 is a block diagram of one embodiment gaming environment of one embodiment of a system and method for programmatic targeted digital advertising. As shown in FIG. 4, the gaming environment may comprise various servers and applications to deliver the programmatic targeted ad to the correct user at the correct non-personal device.

Figure 5:
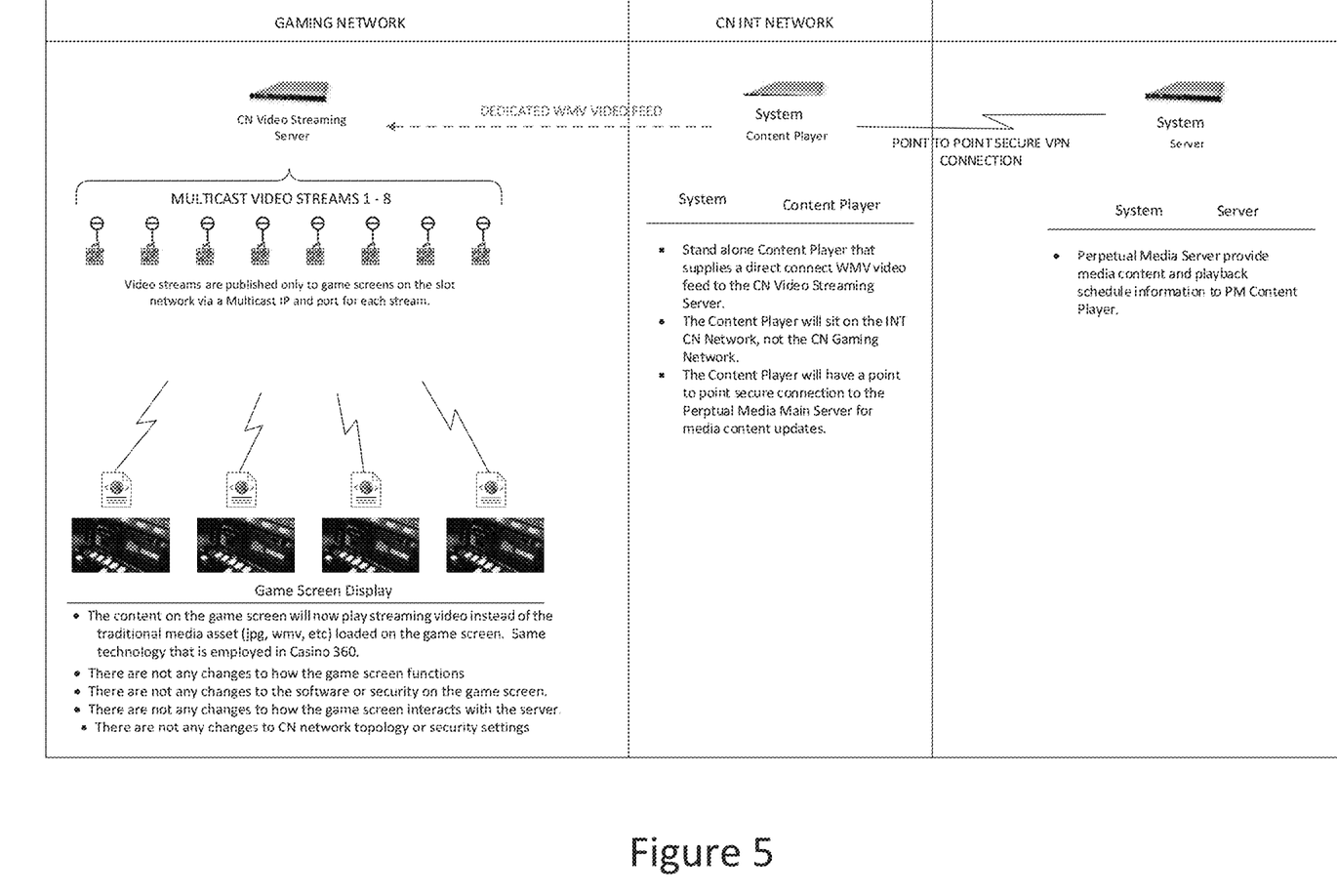
FIG. 5 is an illustration of one embodiment of the system and method for programmatic targeted digital advertising and shows that multiple targeted advertisements may be continually delivered to the non-personal device during the targeted user's session.

FIG. 5 is an illustration of one embodiment of the system and method for programmatic targeted digital advertising and shows that multiple targeted advertisements may be continually delivered to the non-personal device during the targeted user's session. As shown in FIG. 5, the system may further comprise a content player, which is connected to the system server via a point to point secure virtual private network. The system server may provide media content and playback schedule information to the content player. The content player may be a standalone content player that supplies a direct connect WMV video feed to the casino video streaming server. The content player may preferably reside on the INT casino network and not on the casino gaming network. The content player may provide video streams that are published to displays that may have on-device messaging systems. In this manner, these machines will play the system video stream instead of the traditional media asset.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for providing programmatic targeted digital advertisements to targeted users comprising:
    a personal identification device configured to aid in identifying a user to the system, the personal identification device includes at least one of a gaming players club card, a credit/debit card, merchant services data, or a smartphone;
    a first network, wherein the first network is a peer to peer secure virtual private network (VPN) including:
        a system server configured to create system data cookies, the system server including a database containing user attributes;
        a system streaming server configured to deliver a transcoded advertisement to a non-personal device, the system server including a database containing user attributes;
        the relational database management system server configured to receive user data, cull out relevant attributes, and create a system data cookie, wherein the relational database management system server includes an attribute database that contains attribute data related to a plurality of potential targeted users, and wherein the system server is networked to the relational database management system server;
        one or more ad exchanges; and
        one or more programmatic ad providers, wherein the system server is networked to the one or more ad exchanges and the one or more programmatic ad providers; and
    a casino gaming network, different from the first network including:
        one or more non-personal devices including a device ID, wherein the device ID is a unique identifier configured to be activated and correlated to a specific system data cookie for identification of the device when the ad is returned, further including a first display configured to display gaming content, and a second display includes an on-device messaging system configured to display advertising content, and wherein said one or more non-personal devices are networked to a device streaming server; and
        the device streaming server, which is configured to deliver an ad based on the device ID to a specific non-personal device to which system data cookie pertains; and
        an internal casino network, different than the casino gaming network wherein the device streaming server is networked to the system streaming server;
    wherein the system performs the following steps:
        determine by the specific one of the one or more non-personal devices if the personal identification device is present in a specific one of the one or more non-personal devices;
        identify a targeted user by the specific one of the one or more non-personal devices via the personal identification device, based on a presence of the personal identification device, such that a session is initiated, wherein the personal identification device includes personal user data related to the targeted user;
        send the personal user data to a relational database management system server along with a device ID by the specific one of the one or more non-personal devices;
        determine by the relational database management system server, which attributes of the targeted user are relevant for transmission to the one or more programmatic ad providers based on processed user data;
        create by the relational database management system server a system data cookie based on the determined attributes of the targeted user;
        transmit by the relational database management system server, the system data cookie and the device ID to the system server;
        transmit by the system server, the system data cookie to the one or more programmatic ad providers via the one or more ad exchanges;
        accept by the system server, from one of the one or more programmatic ad providers an advertisement that is targeted to the targeted user based on the system data cookie;
        transcode by the system server the targeted advertisement into a streaming video format;
        transmit by the system streaming server the transcoded targeted advertisement to the specific one of the one or more non-personal devices based on the device ID and the device streaming server; and
        display on the second display, in real-time the transcoded targeted advertisement.

2. The system of claim 1, wherein when the transcoded targeted advertisement is displayed on the specific one of the one or more non-personal devices, said non-personal device creates a proof-of-play.

3. The system of claim 2, wherein the proof-of-play is transmitted to at least one of the one or more programmatic ad providers via the device streaming server, the system streaming server, and the system server.

4. The system of claim 1, wherein the one or more non-personal devices include at least one of an electronic gaming machine, a coin operated amusement machine, a game of skill terminal, a video lottery terminal, or an automatic teller machine.

5. The system of claim 1, wherein the attribute data related to a plurality of potential targeted users includes attribute data including at least one of a duration of membership, play history, behavior, demographics, or psychographics.

6. The system of claim 1, wherein the one or more ad exchanges enable one or more programmatic ad partners to bid on providing the advertisement in response to the system data cookie.

7. The system of claim 1, wherein the personal identification device includes a players club card.

8. The system of claim 1, wherein the transcoded targeted ad that is displayed on the specific one of the one or more non-personal devices does not affect or change an experience of said targeted user.

9. The system of claim 1, wherein a plurality of advertisements are delivered to the specific one of the non-personal devices during the session of the targeted user.

10. A method for providing programmatic targeted digital advertisements to targeted users comprising the steps:
   providing a personal identification device configured to aid in identifying a user, the personal identification device includes at least one of a gaming players club card, a credit/debit card, merchant services data, or a smartphone;
   providing a first network, wherein the first network is a peer to peer secure virtual private network (VPN) including:
      a system server configured to create system data cookies, on a first network, the system server including a database containing user attributes;
      a system streaming server configured to deliver a transcoded advertisement to a non-personal device;
      a relational database management system server configured to receive user data, cull out relevant attributes, and create a system data cookie, wherein the relational database management system server includes an attribute database that contains attribute data related to a plurality of potential targeted users, wherein the system server is networked to the relational database management system server;
      one or more ad exchanges; and
      one or more programmatic ad providers, wherein the system server is networked to the one or more ad exchanges and the one or more programmatic ad providers;
   providing a casino gaming network, different from the first network including:
      one or more non-personal devices including a device ID, wherein the device ID is a unique identifier configured to be activated and correlated to a specific system data cookie for identification of the device when the ad is returned, further including a first display configured to display gaming content, and a second display includes an on-device messaging system configured to display advertising content, and wherein said one or more non-personal devices are networked to a device streaming server; and
      the device streaming server, which is configured to deliver an ad based on the device ID to a specific non-personal device to which system data cookie pertains;
   providing an internal casino network, different than the casino gaming network wherein the device streaming server is networked to the system streaming server;
   determining by the specific one of the one or more non-personal devices if the personal identification device is present in a specific one of the one or more non-personal devices;
   identifying a targeted user by a specific one of one or more non-personal devices via a personal identification device, based on a presence of the personal identification device, such that a session is initiated, wherein the personal identification device includes a personal user data related to the targeted user;
   sending the personal user data to a relational database management system server along with a device ID by the specific one of the one or more non-personal devices;
   processing the user data by the relational database management system server;
   determining by the relational database management system server, which attributes of the targeted user are relevant for transmission to the one or more programmatic ad providers based on the processed user data;
   creating by the relational database management system server a system data cookie based on the determined attributes of the targeted user;
   transmitting, by said relational database management system server, the system data cookie and the device ID to the system server;
   transmitting, by the system server, the system data cookie to the one or more programmatic ad providers via the one or more ad exchanges;
   accepting, by the system server, an advertisement that is targeted to the targeted user based on said system data cookie, from one of the one or more programmatic ad providers;
   transcoding, by the system server, the targeted advertisement into a streaming video format;
   transmitting, by the system server, said transcoded targeted advertisement to the system streaming server;
   transmitting, by the system streaming server, the transcoded targeted advertisement to the specific one of the one or more non-personal devices based on the device ID and the device streaming server; and
   displaying on the second display, in real-time, the transcoded targeted advertisement.

11. The method of claim 10, further comprising wherein when the transcoded targeted advertisement is displayed on the specific one of the one or more non-personal devices, the non-personal device creates a proof-of-play.

12. The method of claim 11, wherein the proof-of-play is transmitted to at least one of the one or more programmatic ad providers via the device streaming server, the system streaming server, and the system server.

13. The method of claim 10, wherein the one or more non-personal devices include at least one of an electronic gaming machine, a coin operated amusement machine, a game of skill terminal, a video lottery terminal, or an automatic teller machine.

14. The method of claim 10, wherein the attribute data related to a plurality of potential targeted users includes attribute data including at least one of a duration of membership, play history, behavior, demographics, or psychographics.

15. The method of claim 10, wherein the one or more ad exchanges enable one or more programmatic ad partners to bid on providing the advertisement in response to the system data cookie.

16. The method of claim 10, wherein the personal identification device includes a players club card.

17. The method of claim 10, wherein the transcoded targeted ad that is displayed on the specific one of the one or more non-personal devices does not affect or change an experience of the targeted user.

18. The method of claim 10, wherein a plurality of advertisements are delivered to the specific one of the non-personal devices during the session of the targeted user.

19. A system for providing programmatic targeted digital advertisements to targeted users comprising:

a personal identification device configured to aid in identifying a user to the system, the personal identification device includes at least one of a gaming players club card, a credit/debit card, merchant services data, or a smartphone;

a first network, wherein the first network is a peer to peer secure virtual private network (VPN) including:
  a system server configured to create system data cookies, on a first network, the system server including a database containing user attributes;
  a system streaming server configured to deliver a transcoded advertisement to a non-personal device;
  a relational database management system server configured to receive user data, cull out relevant attributes, and create a system data cookie, wherein the relational database management system server includes an attribute database that contains attribute data related to a plurality of potential targeted users;
  one or more ad exchanges; and
  one or more programmatic ad providers, wherein the system server is networked to the one or more ad exchanges and the one or more programmatic ad providers; and a casino gaming network, different from the first network including:
  one or more non-personal devices including a device ID, wherein the device ID is a unique identifier configured to be activated and correlated to a specific system data cookie for identification of the device when the ad is returned, further including a first display configured to display gaming content, and a second display including an on-device messaging system configured to display advertising content, and wherein said one or more non-personal devices include at least one of: an electronic gaming machine, a coin operated amusement machines game of skill terminal, a video lottery terminal, or an automatic teller machine;
  a device streaming server configured to deliver an ad based on the device ID to a specific non-personal device to which a system data cookie pertains, wherein the one or more non-personal devices are networked to the device streaming server;
  an internal casino network, different than the casino gaming network wherein said device streaming server is networked to the system streaming server;
  wherein the system performs the following steps:
    determine by the specific one of the one or more non-personal devices if the personal identification device is present in a specific one of the one or more non-personal devices;
    identify a targeted user by a specific one of one or more non-personal devices via a personal identification device, based on a presence of the personal identification device, such that a session is initiated, wherein the personal identification device a includes personal user data related to the targeted user;
    send the personal user data to a relational database management system server along with a device ID by the specific one of the one or more non-personal devices, wherein the attribute data related to a plurality of potential targeted users is selected from attribute data including at least one of a duration of membership, play history, behavior, demographics, or psychographics;
    determine which attributes of the targeted user are relevant for transmission to the one or more programmatic ad providers based on processed user data;
    create by the relational database management system server a system data cookie based on the determined attributes of the targeted user;
    transmit by the relational database management system server the system data cookie and the device ID to the system server;
    transmit the system data cookie to the one or more programmatic ad providers via the one or more ad exchanges;
    accept by the system server from one of the one or more programmatic ad providers an advertisement that is targeted to the targeted user based on the system data cookie;
    transcode the targeted advertisement into a streaming video format;
    transmit by the system server the transcoded targeted advertisement to the specific one of the one or more non-personal devices via the device ID and a device streaming server;
    display the transcoded targeted advertisement, in real-time, on the specific one of the one or more non-personal devices, wherein the non-personal device creates a proof-of-play, and wherein the display includes an on-device messaging system;
    receive from the one or more non-personal devices a proof-of-play;
    transmit the proof-of-play to at least one of the one or more programmatic ad providers via a device streaming server, the system streaming server, and the system server; and
    enable by the one or more ad exchanges one or more programmatic ad partners to bid on providing the advertisement in response to the system data cookie.

20. The system of claim 19, wherein a plurality of advertisements are delivered to the specific one of the non-personal devices during the session of the targeted user.

* * * * *